Figure 1:
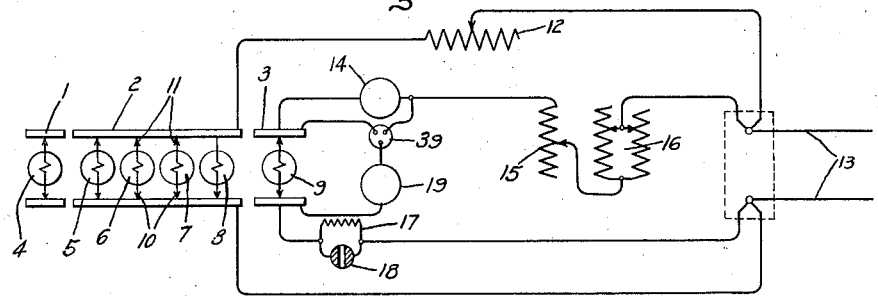

Inventors:
Norman R. Campbell,
Christopher G. Eden,
by
Their Attorney.

July 29, 1930. N. R. CAMPBELL ET AL 1,771,915
METHOD AND APPARATUS FOR TESTING LAMPS
Filed July 7, 1927 2 Sheets-Sheet 2

Inventors:
Norman R. Campbell,
Christopher G. Eden,
by
Their Attorney.

Patented July 29, 1930

1,771,915

UNITED STATES PATENT OFFICE

NORMAN ROBERT CAMPBELL AND CHRISTOPHER GABRIEL EDEN, OF WATFORD, ENGLAND, ASSIGNORS TO GENERAL ELECTRIC COMPANY, A CORPORATION OF NEW YORK

METHOD AND APPARATUS FOR TESTING LAMPS

Application filed July 7, 1927, Serial No. 204,018, and in Great Britain July 27, 1926.

Our invention relates to photometers adapted more particularly for rating incandescent electric lamps or the like, that is to say, for determining the voltage at which they have a prescribed efficiency, or for discovering whether the rating lies within prescribed limits. The chief object is to provide a method of rating which is considerably quicker than any method of the same accuracy which is in use at present, and which requires no photometric judgment on the part of the operator and therefore reduces the likelihood of mistakes.

The method employed for this purpose is that of photoelectric colour-matching, which is already known. Photoelectrically active metals vary in their relative sensitivity to different regions of the spectrum, thus rubidium, compared with sodium, is relatively more sensitive to the red region of the spectrum than to the blue region. Accordingly if a rubidium cell and a sodium cell are exposed to the same source of light, and if arrangements are made that, whatever the source, the proportion of the luminous flux which falls on each of the two cells is the same, the ratio of the currents through the two cells depends on the spectral distribution of the source, and is (approximately at least) independent of its intensity.

In electric incandescent lamps of the same type, the spectral distribution varies simply with the efficiency, and the same distribution may be taken to be associated with the same efficiency. Consequently when a pair of cells are suitably exposed to the luminous flux from an incandescent lamp the ratio of the currents in the two cells is a measure of the efficiency of the lamp; and, in particular, the currents are equal for all lamps of the same efficiency, and different for all lamps of different efficiencies.

In applying this principle one main difficulty arises in assuring that the proportion of the luminous flux from the source which falls on each cell is the same for all sources. This condition may be attained with sufficient accuracy by placing the lamp in a photometric cube, shielding the cells from direct light from the lamp, and by revolving the cells along a common path so that each occupies in the course of a revolution the same position relatively to the source.

The present invention is directed to an improved method of testing lamps and the provision of simple and effective high speed apparatus for reducing to a minimum the time occupied in introducing the lamps into the light diffusing enclosure (which must be substantially the same for all lamps) in removing the lamps from the enclosure, and in making the necessary observations.

According to the present invention the ratings of sources of light such as electric lamps are determined by uniformly exposing each light source to a pair of photoelectric cells of different frequency-sensitivity characteristics. Preferably each source of light is uniformly diffused and brought automatically into a predetermined geometrical relationship with respect to the cells.

Figure 2:
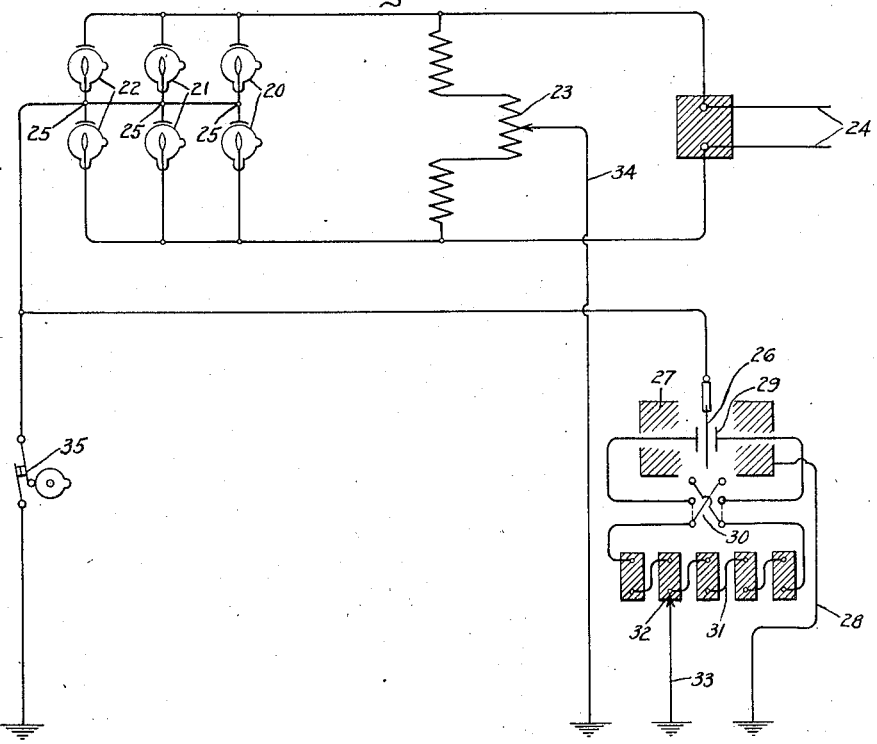
Figure 3:
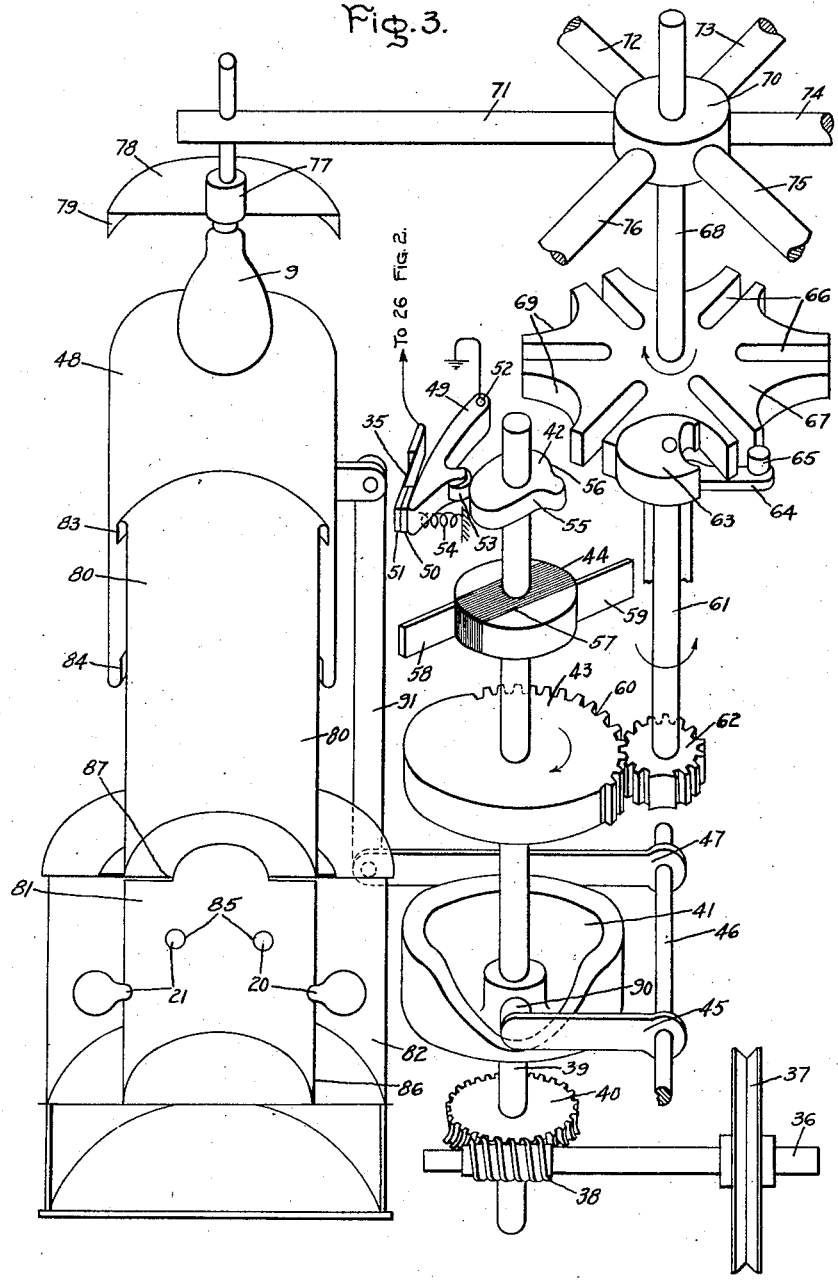

For many purposes a definite determination of the rating of electric incandescent lamps is not required, but only a knowledge as to whether the rating lies within prescribed limits. It is then only necessary to observe whether the difference of the currents in the two cells changes sign when the voltage on the lamp is changed from one limit to the other, and the invention will now be described by way of example in connection with an arrangement for performing such a service, and with reference to the accompanying diagrammatic drawings, in which Fig. 1 shows a diagram of supply circuit connections for the lamps to be rated; Fig. 2 shows a diagram of connections for the indicating circuit; whilst Fig. 3 shows a side elevation of a mechanism for performing the various movements, and effecting control of the electrical circuits. The scope of the invention will be pointed out in the appended claims.

In Fig. 1 a pair of slip rings are divided into separate sections 1, 2 and 3 which are insulated from one another, and lamps 4, 5, 6, 7, 8 and 9 are adapted to be electrically connected between the pairs of rings by brushes 10 and 11, which slidingly engage with the respective rings. Section 2 of the slip rings is connected in series with regulating resistance 12 across mains 13, at the same time that section 3 is connected across these mains in series with ammeter 14, regulating resistances 15 and 16, and resistance 17 arranged in parallel with a rotary switch or equivalent device 18. A voltmeter 19 may be connected across section 3 on either side of ammeter 14 as desired by a switch 39.

The lamps, which move from left to right, are inserted at the position occupied by the lamp 4, where the section 1 of the slip rings is dead. As the lamps progress the freshly inserted lamp moves so that the associated brushes 10 and 11 contact with section 2 of the slip rings which are supplied at a voltage regulated by resistance 12 to approximately the normal voltage of the lamps being rated. As the lamps move over section 2 they attain their normal incandescent state, it being understood that the apparatus shown is intended for use with lamps which have already been aged. If the lamps have not been aged, in order that the lamps may attain a normal incandescent state before reaching section 3 of the slip rings, and in order that the apparatus may be worked at reasonable speed, it is necessary to make provision for a larger number of lamps, for instance, thirty lamps, in the section 2.

Section 3 of the slip rings is supplied with a voltage regulated by resistances 15 and 16 so that the value thereof is alternately slightly below or slightly above the rated voltage of the lamps, and the variation of the said voltage is effected by rotary switch 18, which short-circuits resistance 17 during a part of the time that each lamp is connected to section 3 of the slip rings. The position in which switch 39 is set should be determined by the current taken by the type of lamp being rated.

In Fig. 2 three pairs of photoelectric cells 20, 21 and 22, are connected, together with resistance 23, in parallel across mains 24 of suitable voltage, and connections 25 between cells of the pairs are joined electrically to the moving member 26 of an electroscope the case 27 of which is earthed by conductor 28, the fixed plates 29 of the electroscope being connected through reversing switch 30 to the terminals of a bank of electric cells 31, an adjustable point 32 on which is earthed through lead 33, that provides a means for regulating the zero of the electroscope. The current flowing through the cells may be made nearly zero by the adjustment of shutters adapted to vary the sizes of the light openings of the more sensitive cells of the pairs of cells, and final adjustment may be obtained by varying the point of resistance 23 to which earthed lead 34 is connected.

The cam operated switch or equivalent device 35 earths the moving member 26 of the electroscope when each lamp under test is being connected to or disconnected from section 3 of the slip rings, and also when the voltage applied to the lamp connected to that section is being changed by rotary switch 18. For a short period when the prescribed low voltage is applied to the lamp, however, and for a short period when the prescribed high voltage is applied to the lamp the earthing switch 35 is opened, so that the electroscope gives two readings for each lamp, and if the rating of the lamp lies within the prescribed limits the readings of the electroscope are in opposite senses. Other types of instruments may be used in place of the electroscope.

Fig. 3 shows apparatus in the using of which the operator merely removes and inserts lamps at section 1 of the slip rings, and observes the readings of the electroscope. A single operator, determining whether the actual rating of vacuum lamps at a given efficiency lies within 2% of a prescribed rated voltage, is able to deal with from three hundred to three hundred and fifty lamps an hour in this manner, the operation being entirely automatic, and requiring no judgment on the part of the operator.

In Fig. 3 the shaft 36 is adapted to be driven by an electric motor (not shown) through a pulley wheel 37. The shaft 36 is provided with a worm 38, which drives shaft 39 through worm wheel 40. Rigidly secured to shaft 39 are cams 41 and 42, toothed wheel 43, and rotary switch 44.

Cam 41 upon rotation acts, through roller 90, upon lever 45 rigidly secured to shaft 46, which, therefore, rotates together with arm 47 rigidly secured thereto, and, through link 91, lifts or lowers sleeve 48, which may be provided with suitable guides (not shown).

Cam 42 cooperates with the switch arm 49 of switch 35, which arm bears a moving contact 50 and is earthed, the arm being adapted to make contact with fixed contact 51 which is electrically connected to the moving member 26 of the electroscope. Arm 49 is pivoted at 52, and is provided with a roller 53 pressed into contact with the surface of cam 42 by a spring 54. The contacts 50 and 51 are maintained closed except when rotation of the cam allows roller 53 to enter recess 55, or recess 56, in the cam surface.

Rotary switch 44 consists of a cylinder of insulating material provided with a diametrical conducting strip 57. Brushes 58 and 59 are adapted to rub on the surface of the cylinder. The brushes are respectively connected to opposite ends of resistance 17, Fig. 1, and it therefore follows that when brushes 58 and 59 bear on the ends of strip 57 resistance 17 is shortcircuited.

Toothed wheel 43 is provided with teeth over only a portion 60 of the periphery thereof, and serves to drive a shaft 61 through a pinion 62 also provided with teeth over only a part of the perpihery thereof, the arrangement being such that during each revolution of wheel 43 pinion 62 is rotated once, but remains stationary for the greater part of the time of revolution of wheel 43. To the end of shaft 61 are rigidly secured a sector 63, and an arm 64 carrying a roller 65 adapted to enter slots 66 in a plate 67 rigidly secured to spindle 68. Sector 63 engages in and fits arcuate recesses 69 in the edge of plate 67, thereby locking and positioning the plate except when roller 65, bearing against the sides of slots 66, causes the plate to rotate, when the missing part of the circle of which the sector forms part allows rotation of the plate and of the spindle 68.

On spindle 68 is rigidly mounted a capstan 70 from which project six arms 71, 72, 73, 74, 75 and 76 at the ends whereof are arranged lampholders such as 77. Associated with the spindle are slip rings and brush gear that are not shown in the drawings, but it will readily be understood that a stationary pair of slip rings provided with sections 1, 2 and 3 as in Fig. 1 is arranged symmetrically above spindle 68 and so that pairs of brushes 10 and 11 associated with each of the arms 71 to 76 move round and rub over such slip rings as spindle 68 rotates. The lamps are inserted in and removed from the carrier at the position indicated by arm 72; in the positions indicated by arms 73 to 76 the lamps take up their normal incandescent states; whilst in position 71 each lamp is rated, these positions corresponding respectively to those opposite 1, 2 and 3 of Fig. 1.

To each lampholder is secured a cap or shade 78, the inside of which is blackened, and which is provided with a rim 79 into which the upper end of sleeve 48 projects when the sleeve is fully raised. Sleeve 48 is arranged to slide up and down on cylinder 80 which is mounted on a box having an inner compartment 81, and an outer compartment 82. The cylinder 80 is whitened on the inside, and is provided with a rim 83 which together with a similar rim 84 on sleeve 48 forms a labyrinth helping to ensure a light-tight enclosure when the sleeve is in the fully raised position. In the outer compartment 82 of the box are arranged the three pairs of photoelectric cells 20, 21 and 22 of Fig. 2, the cells being equally spaced, and cells of each pair being arranged adjacent to one another. Small holes 85 are provided in the inner wall 86 of outer compartment 82 for the admission of light to the cells. The holes are provided with suitable shutters (not shown) for adjusting the amount of luminous flux admitted to the different cells. A flat ring 87 whitened on both sides thereof shields the cells from direct light from the lamp. The inside surfaces of the inner compartment 81 are whitened, and the inside surfaces of the outer compartment 82 are blackened.

When sleeve 48 is fully raised there is formed round the lamp 9 being rated a light-tight communication or enclosure consisting of sleeve 48, cap 78, cylinder 80, and inner compartment 81, of which the only light-diffusing part, namely the inner surfaces of sleeve 48 and cylinder 80, ring 87 and the inside surfaces of compartment 81, is the same for all lamps. If the luminous flux is unevenly distributed the resulting interference is largely or wholly neutralized since there are a plurality of pairs of cells affected by light at different positions of inner compartment 81.

Instead of using a plurality of photoelectric cells a single pair of cells might be mounted in a suitable box rotated, for example, at one hundred revolutions a minute.

In operation the lamps are removed and inserted by the operator, the arms 71 to 76 being rotated one sixth of a revolution every time the sleeve 48 is lowered, and the sleeve is fully raised after the completion of each rotational movement of the arms. Each time the sleeve 48 is in the fully raised position switches 18 and 35 are operated to give the desired readings.

In accordance with the provisions of the patent statutes; we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is:

1. The method of determining the rating of electric lamps which consists in exposing to the light of each lamp arranged in a light-diffusing enclosure a pair of photoelectric cells of different frequency-sensitivity characteristics, bringing each lamp in succession and the cells into a predetermined geometrical relationship, within a light-diffusing enclosure which acts in a uniform manner for each lamp and comparing the effect of the light on such cells.

2. The method of determining the rating of an electric lamp which consists in uniformly causing the light from said lamp to influence photoelectric cells of different frequency-sensitivity characteristics and comparing the effect of such light upon such cells.

3. The method of rating electric lamps which consists in adjusting said electric lamps to substantially normal intensity, uniformly causing indirect illumination from such lamps to influence counter-balanced photoelectric cells of different frequency-sensitivity characteristics and observing the resultant effect produced by said illumination upon said cells.

4. The method of rating incandescent lamps which consists in operating said lamps at voltages slightly above and below their normal voltage rating, uniformly causing light from said lamps when so operated to influence photoelectric cells of different frequency-sensitivity characteristics, causing the effects produced upon said cells to oppose each other and observing the resultant effect.

5. In apparatus for use in testing light sources, a plurality of cup-shaped shades for partially enclosing light sources, means for consecutively moving said shades into a testing position, a housing for enclosing photoelectric cells having an opening facing the open portion of a shade when in a test position, a movable sleeve having an interior reflecting surface and having a telescoping light tight joint with said housing and means for moving said sleeve into light tight telescoping relation with a shade when the latter is brought into a test position.

6. In apparatus for use in testing light sources, a plurality of cup-shaped shades for partially enclosing light sources, means for consecutively moving said shades into a test position, a housing for enclosing light sensitive measuring apparatus, said housing having a window facing the open portion of a shade, when in a test position, a movable sleeve adapted to be inserted between said window and the open portion of a shade when in the test position to provide a light tight communication between them, and means for preventing direct light rays from a source located in said shade from striking the light sensitive apparatus in said housing.

7. A light source testing machine comprising light measuring apparatus and means for intermittently moving light sources into testing position with respect to said measuring apparatus, and other means operated automatically with said moving means for establishing a light tight communication between a light source when in the testing position and the said measuring apparatus.

8. An incandescent lamp testing machine comprising light measuring apparatus, a carrier for incandescent lamps, mechanism for intermittently moving said carrier to bring a lamp into testing position opposite to said measuring apparatus, switching means operated by said mechanism for energizing said lamps from a suitable source of supply and for varying the voltage supplied to said lamps when in said testing position and other means operated with said mechanism for automatically establishing a light tight communication between the lamp in the testing position and said measuring apparatus.

In witness whereof, we have hereunto set our hands this twenty-fourth day of June, 1927.

NORMAN ROBERT CAMPBELL.
CHRISTOPHER GABRIEL EDEN.